United States Patent Office 2,811,495
Patented Oct. 29, 1957

2,811,495

MIXED SUSPENSOIDS OF EPOXY RESINS AND POLYAMIDE RESINS

Harold Wittcoff and Malcolm M. Renfrew, Minneapolis, Minn., assignors to General Mills, Inc., a corporation of Delaware No Drawing. Application June 20, 1952,
Serial No. 294,704

3 Claims. (Cl. 260—18)

The present invention relates to mixtures of suspensoids of polyamide resins and complex epoxide resins. The polyamides employed comprise the thermoplastic condensation products of polymeric fat acids with aliphatic polyamines. These polyamides are relatively soft, resinous materials of a somewhat waxy character which are still fusible, and which are soluble in some solvents. The complex epoxides employed result from the reaction of polyhydric phenols with condensation agents containing epoxy groups or potential epoxy groups. The complex epoxides are resinous in nature and display solubility in the usual ketone solvents.

In our co-pending application, Serial No. 276,054, filed March 11, 1952, entitled Thermosetting Resinous Compositions, now U. S. Patent No. 2,705,223, we have disclosed mixtures of polyamide resins and complex epoxides. These compositions are excellent thermosetting materials, having a high degree of resistance to heat, solvent and chemical attack. The thermoset materials are extremely hard, and at the same time are extraordinarily flexible. The compositions there disclosed vary from compositions containing a small quantity of epoxy resins and large quantities of polyamide resins to compositions containing small quantities of polyamide resins and large quantities of epoxy resins. The products varied in their physical properties depending upon the relative proportions of the resins employed as well as on the properties of the respective resins.

The compositions of our above-identified application may be used in the form of hot melts, or in the form of solutions. The hot melt method of employing these compositions has a disadvantage in that the time, during which such a composition may remain liquid, may in some instances be extremely short. In fact, in some instances it may be as short as a fraction of a second. Gelation may then occur, converting the material to an insoluble and infusible form. The actual time prior to the onset of gelation at the temperature at which the material is used is termed the pot life of the composition. Obviously, short pot lives require a great deal of skill on the part of the operator and frequently necessitate the construction of elaborate and expensive specialized equipment in order to use the materials having short pot lives.

The second method of employing these compositions referred to above; namely, the solvent method is highly practical, but is subject to the disadvantage that the solvents employed add to the cost of the operation, and in addition, the solvents present a hazard both from the standpoint of fire and toxicity. The present invention provides a composition containing the two resins in water dispersions. As such, the compositions have an indefinite storage life, which distinguishes them from the solvent solutions which have an adequate, though limited, storage life. In addition, because of the extremely small particle size of the dispersions, intimate combinations of the resins may be obtained at low temperatures. In the hot melt application the resins must be mixed together at temperatures at which both are molten, and accordingly at these temperatures gelation may sometimes occur even before the resins have been intimately mixed.

Such combinations of dispersions are ideal for the coating of paper and plastic and cellulosic films since water dispersions are readily coated by simple equipment ordinarily available to converters. These combinations are also ideal for dipping and spraying operations since they possess low viscosities which make possible the formation of smooth even coatings. At any convenient time after deposition, the homogeneous composite can then be melted in situ by warming, which will confer the thermoset character. It should also be pointed out that this mixture of dispersions, prior to deposition, is readily pigmented for decorative purposes.

It is, therefore, an object of the present invention to provide a novel composition composed of dispersions of polyamide resins and epoxy resins in an aqueous medium.

It is another object of the present invention to provide a process of preparing such dispersions.

The epoxy resins contemplated in the present invention are complex polymeric reaction products of polyhydric phenols with polyfunctional halohydrins such as epichlorohydrin and glycerol dichlorohydrin. Usually the difunctional chlorohydrin is used in proportions in excess of that equivalent to the polyhydric phenol and less than that which is twice the equivalent amount. The reaction is carried out in the presence of caustic alkali which is usually employed in at least a quantity necessary to combine with the halogen liberated from the halohydrin, and usually is employed in excess. The products obtained may contain terminal epoxy groups or terminal epoxy groups and terminal primary hydroxyl groups. In the complex reaction mixture the terminal epoxy groups are generally in excess of the terminal primary hydroxyl groups. Typical polyhydric phenols include resorcinol and various bisphenols resulting from the condensation of phenol with aldehyde and ketones such as formaldehyde, acetaldehyde, acetone, methyl-ethyl-ketone and the like. Resins of this type are disclosed in Greenlee Patent, 2,585,115, and these resins are useful in the present invention.

The molecular weight of the epoxy resins may be controlled by the relative proportions of the reactants as well as by the extent to which the reaction is carried out. The present invention may be applied to all epoxy resins. The molecular weight of the resins is not critical, since both very low molecular weight resins as well as very high molecular weight resins may be employed. The properties of the resultant product, of course, vary with the molecular weight of the epoxy resin employed, as well as with the nature and molecular weight of the polyamide employed.

The polyamide compositions which may be used in the present invention are, in general, those derived from polymeric fat acids and aliphatic polyamines. Resins of this general type are disclosed in Cowan et al. Patent, 2,450,940. Typical of these polyamides are those made with polymeric fat acids and ethylene diamine and/or diethylene triamine. It is possible to produce resins having terminal amine groups or terminal carboxyl groups, or in which some of the terminal groups are amine groups while others are carboxyl groups. Since both amine groups and carboxyl groups are useful in curing the epoxy resins, it will be apparent that a wide variety of these polyamides are useful for that purpose. Furthermore, as will be seen later, these terminal groups may be relied on to disperse the polyamide in an aqueous medium. The amine groups react more readily in curing the epoxy resins, and accordingly it is preferred to employ polyamides containing excess amine groups. Where slower curing is desired, polyamides having excess carboxyl groups and polyamides containing both amine groups and carboxyl groups may be used. The amount of free amine groups or free carboxyl groups measured as amine number and acid number respectively may be determined by titration. The amine number is defined as the number of milligrams of potassium hydroxide equivalent to the free amine groups present in one gram of the resin. The term acid number is defined as the number of milligrams of potassium hydroxide equivalent to the free carboxyl groups present in one gram of the resin. In general, resins having amine or acid numbers within the range of 5–100 are preferred for the present purposes.

The polymeric fat acids employed in preparing the polyamides are those resulting from the polymerization of drying or semi-drying oils, or the free acids or simple aliphatic alcohol esters of such acids. Simple drying or semi-drying oils include soybean, linseed, tung, perilla, oiticica, cottonseed, corn, tall, sunflower, safflower, dehydrated castor oil and the like. In the polymerization process for the preparation of the polymeric fat acids, the fatty acids with sufficient double bond functionality combine for the most part, probably by a Diels-Alder mechanism, to provide a mixture of dibasic and higher polymeric acids. The acids with insufficient functionality to react remain as monomers and may be wholly or partially removed, for example, by distillation. The residue after distillation consists of the desired polymeric acids, and this mixture is used for the preparation of the polyamide resin. In place of this method of polymerization, any other method of polymerization may be employed whether the resultant polymer possesses residual unsaturation or not. The term "polymeric fat acid" as used herein, is intended to include the polymerized mixture of acids obtained, which mixture usually contains a predominant portion of dimeric acids, a smaller quantity of trimeric and higher polymeric acids and some residual monomers.

These polymeric fat acids may be reacted with a variety of aliphatic polyamines for the production of the polyamide. The amidification reaction may be carried out under the usual conditions employed for this purpose, as will be evident from the examples. Polyamides of this type generally have molecular weights varying from 1,000 to 10,000, and are resistant to the corrosive action of water, alkali, acids, oils, greases and organic solvents. The melting points vary depending upon the reactants and the reaction conditions. Where aliphatic diamines such as ethylene diamine are employed for the preparation of the polyamide, the resin may melt within the approximate range of 100–120° C., and usually within the range of 100–105° C.

Higher melting polyamide resins, for example melting within the range of 130–250° C. may be made by employing a mixture of polymeric fat acids and other polybasic acids, the latter having at least two carboxyl groups which are separated by at least three and not more than eight carbon atoms. Typical of these polybasic acids are the aliphatic acids, glutaric, adipic, pimelic, suberic, azelaic and sebacic, and the aromatic acids, terephthalic and isophthalic. The melting point of the copolymer resin may vary within the range previously indicated depending upon the particular reactants, relative ratios thereof, as well as the reaction conditions.

Low melting polyamide resins melting within the approximate range of 25–95° C. may be prepared from polymeric fat acids and aliphatic polyamines having at least 3 atoms intervening between the amine groups principally involved in the amidification reaction. These 3 atoms may be carbon atoms or hetero-atoms. Typical of the polyamines which may be used are diethylene triamine, triethylene tetramine, tetraethylene pentamine, 1,4-diaminobutane, 1,3-diaminobutane, hexamethylene diamine, 3-(N-isopropylamino) propylamine, 3,3'-iminobispropylamine and the like. It will be observed that in the case of the first three named polyamines, there are amine groups which are separated by only two carbon atoms. However, the amidification reaction involves the primary amine groups principally and the end product is suitable for the purpose of the present invention. It is also apparent that some of the polyamines contain only a single primary amine group and in addition a secondary amine group. Under these circumstances, the secondary amine group also becomes involved in the amidification reaction to a large extent, whereas in the case of diethylene triamine, for example, the two primary amine groups are amidified principally. The suspensoids of these low melting polyamides when spread out in the form of films dry to form a continuous tacky film at temperatures as low as room temperature, and even somewhat below room temperature. The preferred group of these low melting polyamides are derived from polymeric fat acids and diethylene triamine and melt at from 40–70° C.

The polyamides may be of either high or low molecular weight. A desirable polyamide is one derived from diethylene triamine and a large excess of polymeric fat acids. The product obtained is essentially monomeric in nature and is composed of the diethylene triamine, each of the amino groups being amidified with dimer fatty acids. In addition, the product contains some relatively low molecular weight polymeric material. This product, however, serves admirably as a dispersion and also serves to cure the epoxy resin by means of the free carboxyl groups instead of by means of amino groups.

The respective resins may be dispersed in water by any method. They may be dispersed separately, or the resins themselves may be mixed and dispersed together. Since, however, the preparation of a mixture of the resins prior to dispersion may be subject to some of the disadvantages pointed out previously, it is preferred to disperse the resins separately and then mix the dispersion. The polyamide resin may be dispersed by the employment of various dispersing agents or by various mechanical means such as ball milling, precipitation in finely divided form by the addition of a solution of the resin to a non-solvent, and so forth. A preferred method of dispersing the polyamide is by means of intrinsic dispersing agents formed with either excess amine groups or excess carboxyl groups, with either an added acid or alkaline material, as disclosed in the copending applications of Harold Wittcoff and Wesley A. Jordan, Serial Nos. 141,262, filed January 30, 1950, now abandoned, 227,535, filed May 21, 1951, now abandoned, and 239,017, filed July 27, 1950, now abandoned, or as disclosed in the application of Harold Wittcoff, Serial No. 204,091, filed January 2, 1951, now U. S. Patent No. 2,728,737. The suspensoids derived from polyamides having excess amine groups are cationic in nature, and may be used as such, or may be converted to anionic suspensoids by the addition of an excess of an anionic emulsifying agent as disclosed in the application of Harold Wittcoff and Malcolm M. Renfrew, Serial No. 220,138, filed April 9, 1951, now U. S. Patent No. 2,768,090. Where compounding ingredients are employed with the polyamide, it may be desirable to add a fatty amine salt as described in the application of Harold Wittcoff, Serial No. 220,136, filed April 9, 1951, now abandoned. It will thus be seen that any dispersion in an aqueous medium of a polyamide derived from polymeric fat acids may be employed. These dispersions may be either anionic, cationic or non-ionic, and may be made by chemical or mechanical methods.

The epoxy resin dispersions may be readily prepared by the simple procedure described in the examples. This involves the stabilization of the dispersion with a protective colloid, such as polyvinyl alcohol, or the solution of the epoxy resin in an organic solvent, such as a ketone, may be mixed with water and a protective colloid to yield a non-ionic dispersion without the aid of the ordinary emulsifying or dispersing agent. Numerous protective colloids in addition to polyvinyl alcohol may be used, and these include methyl cellulose, carboxymethyl cellulose, carboxymethyl starch, various natural gums such as gum tragacanth, and karaya gum, starches, dextrins, and the like. If desired, the epoxy resin dispersions may be prepared with various dispersing agents or by various mechanical means such as ball milling, precipitation in finely divided form by the addition of a solution of the resin to a nonsolvent, and by other methods. The particular manner in which the dispersion is obtained is non-critical.

The compositions of the present invention are useful not only in the form of dispersions but also in the form of the finely divided mixed solids. Thus, for molding operations these suspensoids may be made into dry powder by evaporation of the water to provide an intimately dispersed mixture of the two resins, which may then be molded. One of the important objections to the use of the combination of polyamide-epoxy resins from hot melt is the inability to obtain intimate mixing without danger of gelation. By the procedure of drying a mixture of the dispersions, a highly intimate mixture of the two resins is obtained which gives excellent results in molding, casting and laminating operations.

In place of evaporating the moisture from the mixed dispersions, it is possible to precipitate the two resins in a highly intimately dispersed form by several procedures. One of the simplest is to combine an epoxy resin dispersion with a polyamide resin dispersion of opposite charge. Thus the epoxy resin dispersion may be anionic, whereas the polyamide resin dispersion may be cationic, or vice versa. Precipitation may also be accomplished by the usual procedure of freezing the combined dispersions and then allowing them to thaw; by the addition of metallic cations or non-metallic anions to the mixed dispersion, by extremely high-speed agitation, and by other mechanical means ordinarily used to destroy the stability of dispersions. Once the precipitation has been accomplished, the precipitated material is separated from the aqueous phase by filtration and is then subjected to drying to obtain a molding composition.

*Example 1*

A polyamide was prepared from polymeric fat acids and diethylene triamine in the ratio of 1.5 equivalents of amine to 1 equivalent of carboxyl.

The polymeric fat acid employed had the following composition:

| | |
|---|---|
| Percent monomer | 10.0 |
| Percent dimer | 69.5 |
| Percent trimer | 20.5 |
| D/T ratio | 3.39 |
| Acid number | 186.5 |
| Saponification equivalent | 291.1 |

Forty pounds of this polymeric fat acid, 2.4 pounds of cottonseed fatty acids, and 7.48 pounds of a 95.6% aqueous solution of diethylene triamine were heated with stirring to 200° C. Heating was effected slowly since a tendency toward foaming was observed. After the temperature reached 200° C. it was maintained there for 3 hours with vigorous agitation, and during the last hour vacuum was employed. At the end of the reaction period the vacuum was released and the product was cooled. The reaction mixture was maintained under an inert gas blanket during all the time at which it was at an elevated temperature with the exception of the time during which the vacuum was employed. The product had the following properties:

| | |
|---|---|
| Melting point (ball & ring) ° C | 46.0–46.5 |
| Color [1] (Gardner) | 10–11 |
| Viscosity [1] at 25° C. (Gardner-Holdt) | B–C |
| Acid number | 5.2 |
| Amine number | 86 |

[1] Determinations carried out on 35% solutions in butanol-toluene (1:1).

To 32.3 pounds of the above resin heated to 160° C. there was added with vigorous stirring 32.3 pounds of hot water containing 0.26 pound of acetic acid. After agitation for one hour, there resulted an extremely smooth dispersion, which provided a continuous tacky film. The suspensoid demonstrated the following properties:

| | |
|---|---|
| Percent solids | 52.1 |
| Acid number | 6.0, 6.1 |
| Amine number | 43.2, 43.8 |
| pH | 7.6 |

An epoxy resin comprising the condensation product of bisphenol and epichlorohydrin (Epon 1001) was dispersed by dissolving 45 parts of the epoxy resin in 30 parts of methyl ethyl ketone. To this solution was added a solution of 30 parts of water containing nine parts of low viscosity polyvinyl alcohol. Agitation produced a stable dispersion containing 47% solids. This dispersion and the polyamide dispersion were mixed. Three different mixtures were made so that the ratios of solid epoxy resin to solid polyamide resin were 80:20, 50:50, and 20:80 respectively. These mixtures were coated on label paper and were dried. The water evaporated off readily. The coatings were then cured by subjecting the papers to a temperature of 100–110° C. for 3–5 minutes. Extremely glossy coatings resulted which were infusible and which were insoluble in virtually all or most organic solvents, acids and bases. The compositions containing the larger quantity of polyamide resin demonstrated the best solvent resistance. The mixed dispersions were stable and could be stored indefinitely. At higher temperatures for curing the coatings, shorter time periods are required.

*Example 2*

The epoxy resin dispersion described in Example 1 was mixed with a polyamide resin dispersion prepared from polymeric fat acids and diethylene triamine.

A polyamide was prepared from 41 pounds of dimeric fat acids and 2.54 pounds of 95.6% diethylene triamine. The dimer acids were employed in the ratio of 2 equivalents per equivalent of the diethylene triamine. The dimer acids and the diethylene triamine were mixed together in a kettle and heated. Approximately 2 hours was required to raise the temperature to 400° F., and the temperature was maintained at 400° F. for 3 hours, during the last hour of which vacuum was applied to the kettle. The vacuum was broken by the introduction of carbon dioxide and the product was poured over solid carbon dioxide to prevent oxidation. The product had the following properties:

| | |
|---|---|
| Viscosity (Gardner Holdt-35% solution in butanol-toluene 1:1) | A2 |
| Gel time min | 35 |
| Ball and ring melting point ° C | 33 |
| Acid number | 91 |
| Amine number | 3.3 |
| Color | 10–11 |

To a melt of 4.0 parts of the above described resin, heated to approximately 130° C. was added a solution comprising 60 parts of water and 2.7 parts of morpholine. The solution was heated practically to its boiling point prior to addition to the resin, and the admixture was accompanied by vigorous agitation. A smooth suspensoid resulted readily.

This suspensoid and the epoxy resin suspensoid of Example 1 were mixed so that the ratio of solid epoxy resin to solid polyamide resin was 80:20, 50:50, and 20:80. These dispersions were quite stable and were coated on paper to obtain coatings which cured at temperatures of 100–110° C. in 5–30 minutes. More rapid curing can be obtained by the employment of higher temperatures.

*Example 3*

A copper wire was passed through the mixture of dispersions in Example 1 in which there were equal parts of the epoxy resin and polyamide resin on a solid basis. The wire was then placed in an oven at 110° C. for 20 minutes to provide a very smooth, even coating which was heat stable, resistant to numerous solvents, highly abrasion resistant, extremely flexible and extremely adherent. Metal objects coated with the mixed suspensoids described in Examples 1 and 2 were allowed to dry to obtain a film which cured readily. Adhesion of these compositions to metal was found to be extremely good.

*Example 4*

The 50–50 mixture of suspensoids described in Example 1 was used to laminate two tin strips. The surfaces to be laminated were coated with the dispersion which was then dried and the two coated surfaces were placed face to face and were subjected to the action of heat and pressure. A very strong bond with excellent flexibility resulted and the bond withstood the action of numerous organic solvents and chemicals.

*Example 5*

The 50–50 mixture of suspensoids described in Example 1 was used as the low pressure bonding resin for the lamination of glass cloth. The mixed water dispersions were spread on the cloth and were allowed to dry for a few minutes. The coated cloth was then placed next to a piece of uncoated glass cloth and the laminate was subjected to a pressure of about 1 pound per square inch, while being heat treated at 120° C. for 30 minutes. An extremely strong bond resulted.

*Example 6*

To the epoxy resin dispersion described in Example 1 was added 1%, on a solids basis, of dodecylamine acetate. This mixture was then mixed with an anionic polyamide resin dispersion described in Example 2 in a ratio such that equal portions of the solid resin were present. After a few minutes coagulation occurred, and the precipitated material was removed by filtration. This precipitate was then dried in a vacuum oven after which it was placed in a small mold and was subjected to a temperature of 180° C. for a few minutes. The mixture cured with practically no shrinkage. The composition was free of air bubbles and released readily from the surface of the mold.

*Example 7*

To the epoxy resin dispersion described in Example 1 was added 1% on a solids basis of an anionic detergent. The detergent was a sodium alkylaryl sulfonate sold commercially as Naccanol NRSF. The mixture was combined with the cationic polyamide resin dispersion described in Example 1 in a ratio such that equal portions of the resins were present. After a few minutes coagulation took place and the coagulum was removed by filtration. After drying the coagulum was subjected to exactly the same process as described in the preceding example with the same results.

We claim as our invention:

1. An aqueous dispersion of an epoxy resinous material containing terminal epoxy groups and a polyamide reaction product of polymeric fat acids and an aliphatic polyamine containing terminal amine groups in which the dispersion of the polyamide particles is stabilized by means of an intrinsic dispersing agent comprising salt groups formed by the reaction of the terminal amine groups on the polyamide with a water soluble organic carboxylic acid.

2. An aqueous dispersion of an epoxy resinous material containing terminal epoxy groups, said epoxy resinous material being the reaction product of a bisphenol and a glycerol chlorohydrin, and a polyamide reaction product of polymeric fat acids and an aliphatic polyamine, said polyamide having a melting point within the range of 25 to 95° C. in which the polyamide is derived from an excess of said polyamine and contains terminal amine groups, and the dispersion is stabilized by means of salt groups formed by reacting the terminal amine groups on the polyamide with a water soluble organic carboxylic acid.

3. An aqueous dispersion of an epoxy resinous material containing terminal epoxy groups, said epoxy resinous material being the reaction product of a bisphenol and a glycerol chlorohydrin, and a polyamide reaction product of polymeric fat acids and an aliphatic polyamine, said polyamide having a melting point within the range of 25 to 95° C. in which the polyamide is derived from an excess of said polyamine and contains terminal amine groups, and the dispersion is stabilized by means of salt groups formed by reacting the terminal amine groups on the polyamide with acetic acid.

References Cited in the file of this patent

UNITED STATES PATENTS

| | | |
|---|---|---|
| 2,345,632 | Robinson et al. | Apr. 4, 1944 |
| 2,450,940 | Cowan et al. | Oct. 12, 1948 |
| 2,589,245 | Greenlee | Mar. 18, 1952 |
| 2,626,223 | Sattler et al. | Jan. 20, 1953 |
| 2,705,223 | Renfrew et al. | Mar. 29, 1955 |

FOREIGN PATENTS

| | | |
|---|---|---|
| 504,084 | Belgium | July 14, 1951 |